United States Patent
Joung et al.

(10) Patent No.: US 9,204,366 B2
(45) Date of Patent: Dec. 1, 2015

(54) FLEXIBLE CONNECTION CONTROL FEMTOCELL ACCESS POINT (FAP) DEVICE OF SMALL CELL AND METHOD OF DRIVING THE SAME

(71) Applicant: INNOWIRELESS CO., LTD, Gyeonggi-do (KR)

(72) Inventors: Jin-Soup Joung, Gyeonggi-do (KR); Seung-Hwan Ji, Gyeonggi-do (KR); Beom-Sik Kim, Gyeonggi-do (KR); Sang-Ik Cho, Gyeonggi-do (KR)

(73) Assignee: INNOWIRELESS CO., LTD. (KR)

( * ) Notice: Subject to any disclaimer, the term of this patent is extended or adjusted under 35 U.S.C. 154(b) by 89 days.

(21) Appl. No.: 14/216,327

(22) Filed: Mar. 17, 2014

(65) Prior Publication Data

US 2015/0208323 A1   Jul. 23, 2015

(30) Foreign Application Priority Data

Jan. 17, 2014 (KR) .................. 10-2014-0006193

(51) Int. Cl.
| | |
|---|---|
| *H04W 4/00* | (2009.01) |
| *H04W 48/06* | (2009.01) |
| *H04W 84/04* | (2009.01) |
| *H04L 12/54* | (2013.01) |
| *H04W 28/26* | (2009.01) |
| *H04W 36/22* | (2009.01) |
| *H04W 76/06* | (2009.01) |

(52) U.S. Cl.
CPC ............ *H04W 48/06* (2013.01); *H04L 12/5692* (2013.01); *H04L 12/5695* (2013.01); *H04W 28/26* (2013.01); *H04W 36/22* (2013.01); *H04W 76/064* (2013.01); *H04W 76/066* (2013.01); *H04W 84/045* (2013.01)

(58) Field of Classification Search
CPC ..... H04W 48/06; H04W 28/26; H04W 36/22; H04W 76/064; H04W 76/066; H04W 84/045; H04L 12/5692; H04L 12/5695
USPC .................. 455/435.1, 436; 370/328
See application file for complete search history.

(56) References Cited

U.S. PATENT DOCUMENTS

| | | | |
|---|---|---|---|
| 8,060,408 B2* | 11/2011 | Koether et al. | 705/15 |
| 8,331,236 B2* | 12/2012 | Cavalli et al. | 370/235 |
| 9,055,496 B2* | 6/2015 | Das et al. | 36/14 |
| 2013/0189991 A1* | 7/2013 | Rose et al. | 455/436 |
| 2014/0269269 A1* | 9/2014 | Kovvali et al. | 370/229 |
| 2015/0208280 A1* | 7/2015 | Lorca Hernando | 28/8 |

FOREIGN PATENT DOCUMENTS

WO      2009045317 A2    4/2009

* cited by examiner

*Primary Examiner* — Amancio Gonzalez
(74) *Attorney, Agent, or Firm* — Kaplan Breyer Schwarz & Ottesen, LLP

(57) ABSTRACT

A flexible connection control femtocell access point device of a small cell and a method of driving the same are provided. A maximum system load is used and network efficiency is maximized by calculating a system load occurring when a mobile station is newly connected according to the type of services that user equipments, that is, mobile stations, in a small cell, such as a femtocell, desire to use, comparing the calculated system load and the maximum system load, and determining whether to limit connection of the mobile station.

12 Claims, 14 Drawing Sheets

| SERVICE TYPE | DESCRIPTION |
|---|---|
| VoLTE | RTP VOICE CALL |
| PSVT | RTP VIDEO CALL |
| Normal PS | TCP-HTTP/TCP-FTP SERVICE |

Figure 5

| OPERATION STATE | Target S1AP message | INFORMATION IN MESSAGE |
|---|---|---|
| Attach / Service Request | Initial Context Setup | QCI |
| | E-RAB Setup Request | |
| Hand in | Handover Request | QCI |

Figure 10

| QCI | Resource Type | Priority | Packet Delay Budget | Packet Error Loss Rate | Example Services |
|---|---|---|---|---|---|
| 1 | GBR | 2 | 100 ms | $10^{-2}$ | Conversational Voice |
| 2 | GBR | 4 | 150 ms | $10^{-3}$ | Conversational Video (Live Streaming) |
| 3 | GBR | 3 | 50 ms | $10^{-3}$ | Real Time Gaming |
| 4 | GBR | 5 | 300 ms | $10^{-6}$ | Non-Conversational Video (Buffered Streaming) |
| 5 | Non-GBR | 1 | 100 ms | $10^{-6}$ | IMS Signalling |
| 6 | Non-GBR | 6 | 300 ms | $10^{-6}$ | Video (Buffered Streaming) TCP-based (e.g., www, e-mail, chat, ftp, p2p file sharing, progressive video, etc.) |
| 7 | Non-GBR | 7 | 100 ms | $10^{-3}$ | Voice, Video (Live Streaming) Interactive Gaming |
| 8 | Non-GBR | 8 | 300 ms | $10^{-6}$ | Video (Buffered Streaming) TCP-based (e.g., www, e-mail, chat, ftp, p2p file sharing, progressive video, etc.) |
| 9 | Non-GBR | 9 | | | |

Figure 11

| SERVICE TYPE | QCI of E-RAB | DESCRIPTION |
|---|---|---|
| VoLTE | QCI1 | RTP VOICE CALL |
| PSVT | QCI1 for voice<br>QCI2 for Video | RTP VIDEO CALL |
| Normal PS | QCI6 | TCP-HTTP/TCP-FTP SERVICE |

Figure 12

| Current Service | Received Message | E-RAB QCI | Transfer to |
|---|---|---|---|
| VoLTE | E-RAB Release | 2 | VoLTE |
| | E-RAB Release | 1 and 2 | Normal PS |
| | E-RAB Setup | 2 | PSVT |
| PSVT | E-RAB Release | 1 | Normal PS |
| | E-RAB Setup | 1 | VoLTE |
| Normal PS | E-RAB Setup | 1 and 2 | PSVT |

Figure 13

| TO / FROM | Normal PS | PSVT | VoLTE |
|---|---|---|---|
| Normal PS | — | PERMIT TRANSFER | PERMIT TRANSFER |
| PSVT | RELEASE WHEN SERVICE ENDS | — | PERMIT TRANSFER |
| VoLTE | RELEASE WHEN SERVICE ENDS | PERMIT TRANSFER AFTER RELEASING MOBILE STATION BEING PROVIDED WITH NORMAL PS | — |

Figure 14

FLEXIBLE CONNECTION CONTROL FEMTOCELL ACCESS POINT (FAP) DEVICE OF SMALL CELL AND METHOD OF DRIVING THE SAME

CROSS-REFERENCE TO RELATED APPLICATION

This application claims priority to and the benefit of Korean Patent Application No. 10-2014-0006193, filed on Jan. 17, 2014, the disclosure of which is incorporated herein by reference in its entirety.

BACKGROUND

1. Field of the Invention

The present invention relates to a femtocell access point (FAP) device of a small cell, and more particularly, to a flexible connection control FAP device of a small cell which uses a maximum system load and maximizes network efficiency by calculating a system load occurring when a mobile station newly connects according to service types that the mobile stations, such as user equipments (UEs), in a small cell of a femtocell, etc., desire to use, comparing the calculated system load and a maximum system load, and determining and controlling whether to limit connection of the mobile station, and a method of driving the same.

2. Discussion of Related Art

A small cell is a base station which covers an area smaller than that of a mobile communication base station, and has a relatively low data process capacity compared to a macro base station. In an access point (AP) for the small cell, since the maximum number of users is set, phenomena of malfunctioning and decline in communication quality due to data service capacity excess of the AP are prevented. However, in conventional technology for limiting connection by limiting the maximum number of users, even when the number of connected users reaches the maximum number of users, data service capacity of an actual system does not reach the maximum number of users. For example, even if the number of connected users reaches the maximum number of users, when there are a plurality of voice over Long Term Evolution (VoLTE) users using only small amounts of data among the number of connected users, connection request of the mobile station is limited even when the data service capacity of the system is sufficiently empty. To improve the inefficiency, a method of flexibly controlling the maximum number of users based on the system load is needed.

As one example of background technology of the present invention, technology for authenticating mobile units attached in a femtocell communicating with a secure core network, such as an internet protocol multimedia subsystem (IMS), is disclosed in International Publication No. WO 2009/045317 as shown in FIG. 1. The technology relates to a method of communicating with the secure core network, such as the IMS network, and includes receiving a global challenge including information indicating a random number from a femtocell, and in a first secure entity of the IMS network, receiving an authentication response calculated by the mobile unit based on the random number and a first key announced by a mobile unit and not announced by the femtocell, and determining whether the random number is a legitimate number provided to the femtocell by the IMS network.

Other background technology of the present invention relates to a mobility management method for a third generation Long Term Evolution (LTE) system using a load dispersion-based adaptive handover shown in FIG. 2. The technology includes determining a load condition of a cell which is currently in service; when the load condition of the cell which is currently in service is an overload condition, calculating a handover hysteresis threshold of each of adjacent cells according to the handover hysteresis threshold of the cell which is currently in service and the load condition of the adjacent cells, for each of the adjacent cells of the cell which is currently in service; transmitting the calculated handover hysteresis threshold of each of the adjacent cells from the cell which is currently in service to user equipments (UEs) which are serviced; and performing a handover operation that a UE satisfying a condition that a difference between reception signal strength by at least one among the adjacent cells and the reception signal strength by the cell which is currently in service be larger than the handover hysteresis threshold of the at least one adjacent cell among the UEs handed over from the cell which is currently in service to the at least one among the adjacent cells.

This research was conducted as part of the Korea Communications Agency's "Development of combined control management systems for wired/wireless equipment based on OpenFlow."

SUMMARY OF THE INVENTION

The present invention is directed to a femtocell access point (FAP) device of a small cell and a method of driving the same which flexibly control connection of a mobile station by classifying user equipments (UEs), that is, mobile stations according to the type of services, such as a voice over Long Term Evolution (VoLTE) service, a packer switch video telephony (PSVT) service, and a normal packet service (PS) that the mobile stations desire to use in a small cell, such as a femtocell, etc.

Further, the present invention is directed to an FAP device of a small cell and a method of driving the same which classify the type of services of mobile stations using a quality of service (QoS) classifier identifier (QCI) value allocated in each of evolved packet system (EPS) bearers, and control whether to permit connection or service of a new mobile station based on a system load limit occurring whenever each of the mobile stations in the cell is newly connected or transfers service type.

Moreover, the present invention is directed to an FAP device of a small cell and a method of driving the same which preserve service continuity by permitting and releasing connection of a new mobile station considering order of priority according to the type of services when the FAP device has a maximum system load.

According to an aspect of the present invention, there is provided a flexible connection control FAP device of a small cell comprising an LTE link and providing VoLTE, PSVT, and normal PS services to mobile stations connected to the small cell, the flexible connection control FAP device including: a controller; a UE interface connected to the controller; a UL interface configured to connect an LTE FAP to an MME through the LTE link; and an FAP access unit for an FAP service, wherein the controller comprises: an S1AP message buffer configured to store an S1AP message of an E-RAB for setup, change, or release of a service; a system load data memory configured to store system load related information of the LTE FAP; and a mobile station service type memory including a VoLTE memory, a PSVT memory, and a normal PS memory configured to store information on mobile stations to which the LTE FAP is providing a service according to the type of the VoLTE, PSVT, and normal PS services, wherein the controller determines and controls connection of a mobile station by comparing a calculated system load and a maximum system load after calculating a system load when the mobile station is newly connected or transfers the type of service according to the type of the services that the mobile stations desire to use.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 5 is a table showing service types provided in a small cell configured as an FAP according to the present invention;

FIG. 10 is a table showing a request message according to connection of a new mobile station and a hand in request with respect to an LTE FAP, and information for extracting a service type with respect to the new mobile station according to an embodiment of the present invention;

FIG. 11 is a table showing a content of a quality of service (QoS) class identifier (QCI) prescribed in a 3GPP TS 23.203 V12.2.0 (2013-09) according to an embodiment of the present invention;

FIG. 12 is a table showing an example of QCI values for extracting a service type for a new mobile station according to an embodiment of the present invention;

FIG. 13 is a table showing a service type transfer process relationship of a mobile station connected to an LTE FAP and provided with a service according to an embodiment of the present invention; and FIG. 14 is a table showing a service type transfer rule of a mobile station currently connected to an LTE FAP and provided with a service according to an embodiment of the present invention.

DETAILED DESCRIPTION OF EXEMPLARY EMBODIMENTS

The following description is provided to illustrate the principles of the present invention. Accordingly, even though not described clearly or not illustrated herein, those of ordinary skill in the art embody the principles of the present invention and invent various apparatuses included in concepts and scope of the present invention. Every terms and exemplary embodiments described herein is provided to assist the reader in gaining a comprehend understanding of concept of the present invention, and is not intended to limit to the concept of the present invention. Further, descriptions described specific exemplary embodiments as well as principles, aspects and embodiments of the present invention should be intended to include structural and functions equivalents.

Exemplary embodiments of the present invention will be described in detail below with reference to the accompanying drawings. While the present invention is shown and described in connection with exemplary embodiments thereof, when it will be determined that detailed descriptions with respect to related disclosure technology unnecessarily obscure the concept of the present invention, the detailed descriptions will be omitted. Hereinafter, exemplary embodiments will be described in detail with reference to accompanying drawings.

Figure 1:
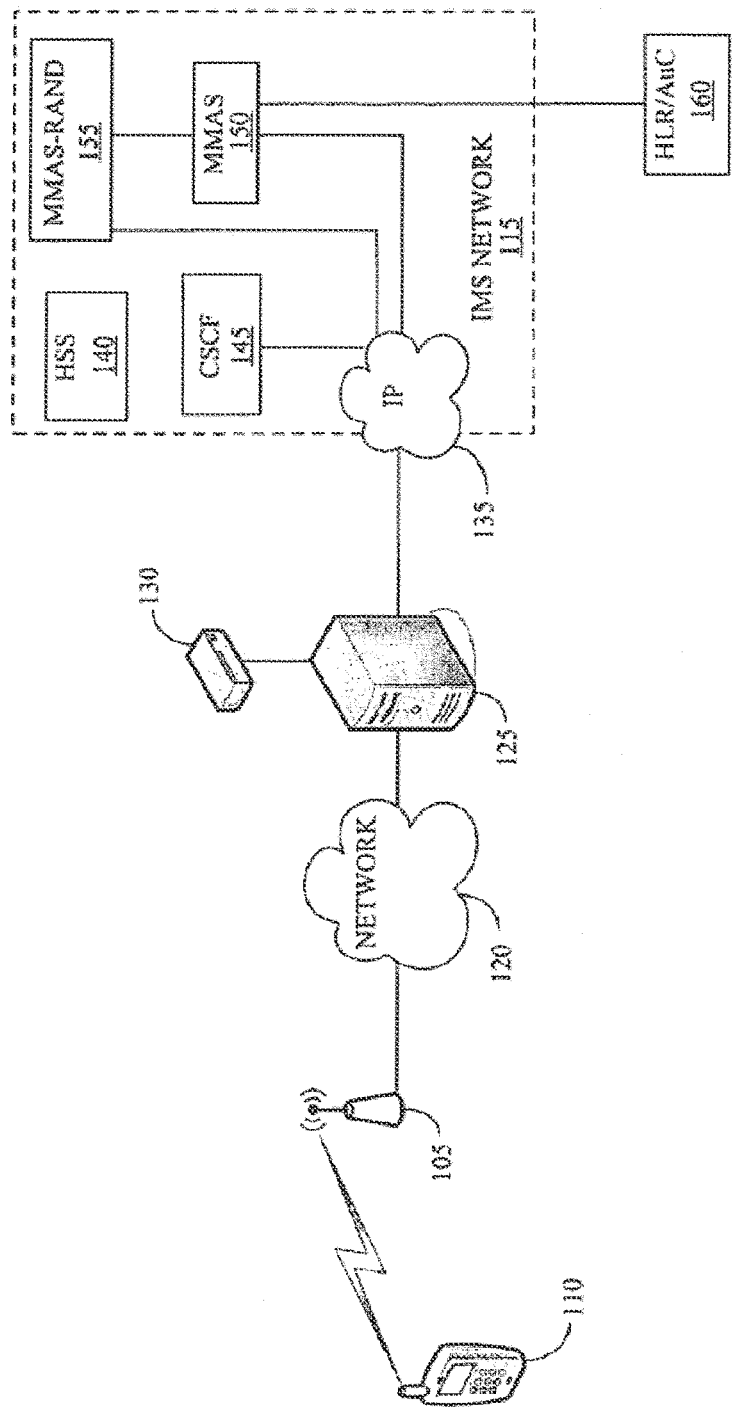
FIG. 1 is a diagram for explaining a method of authenticating mobile units attached to a femtocell for communication with a secure core network such as an Internet protocol multimedia subsystem (IMS) according to background technology of the prevent invention.
Figure 2:
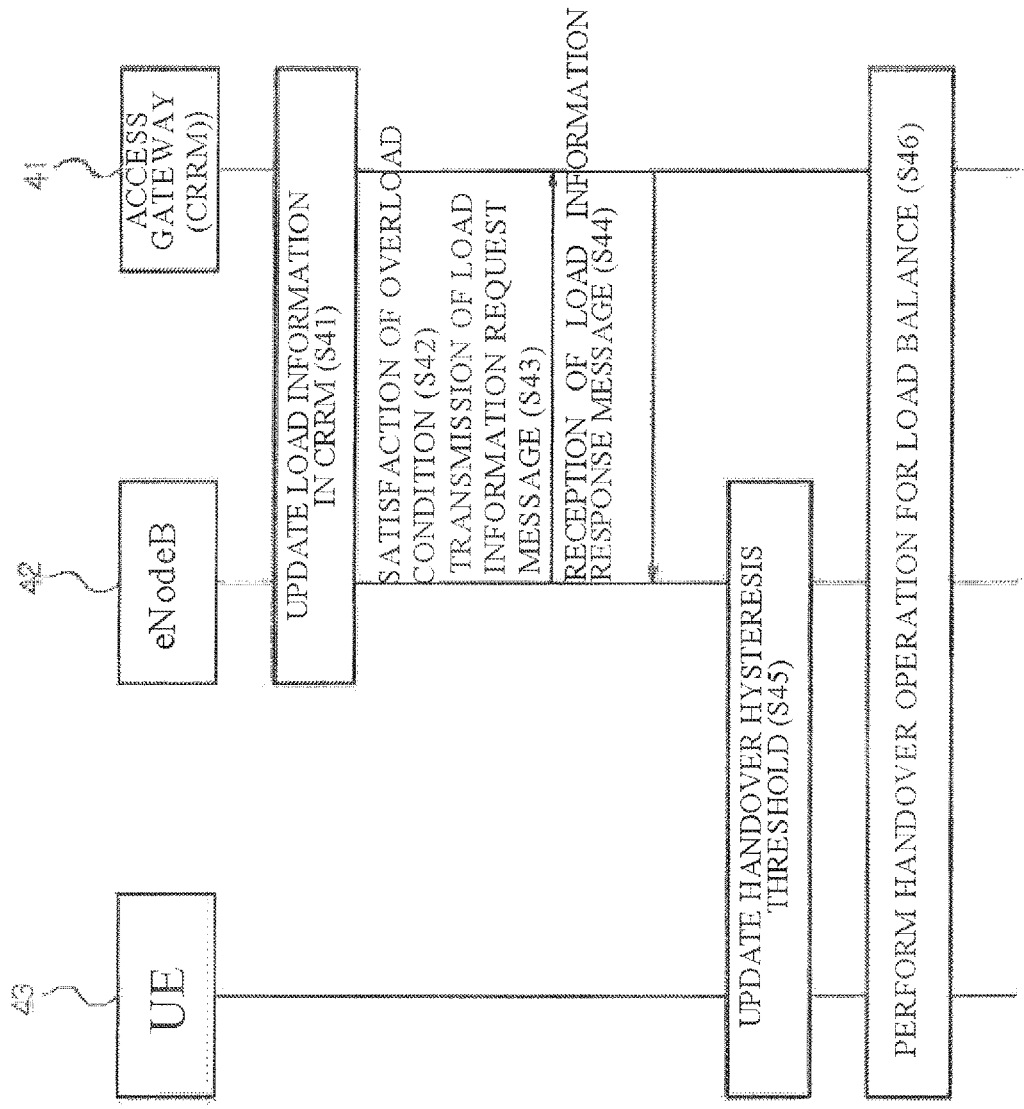
FIG. 2 is a diagram for explaining a mobility management method for a third generation Long Term Evolution (LTE) system using a load dispersion-based adaptive handover according to other background technology of the prevent invention.
Figure 3:
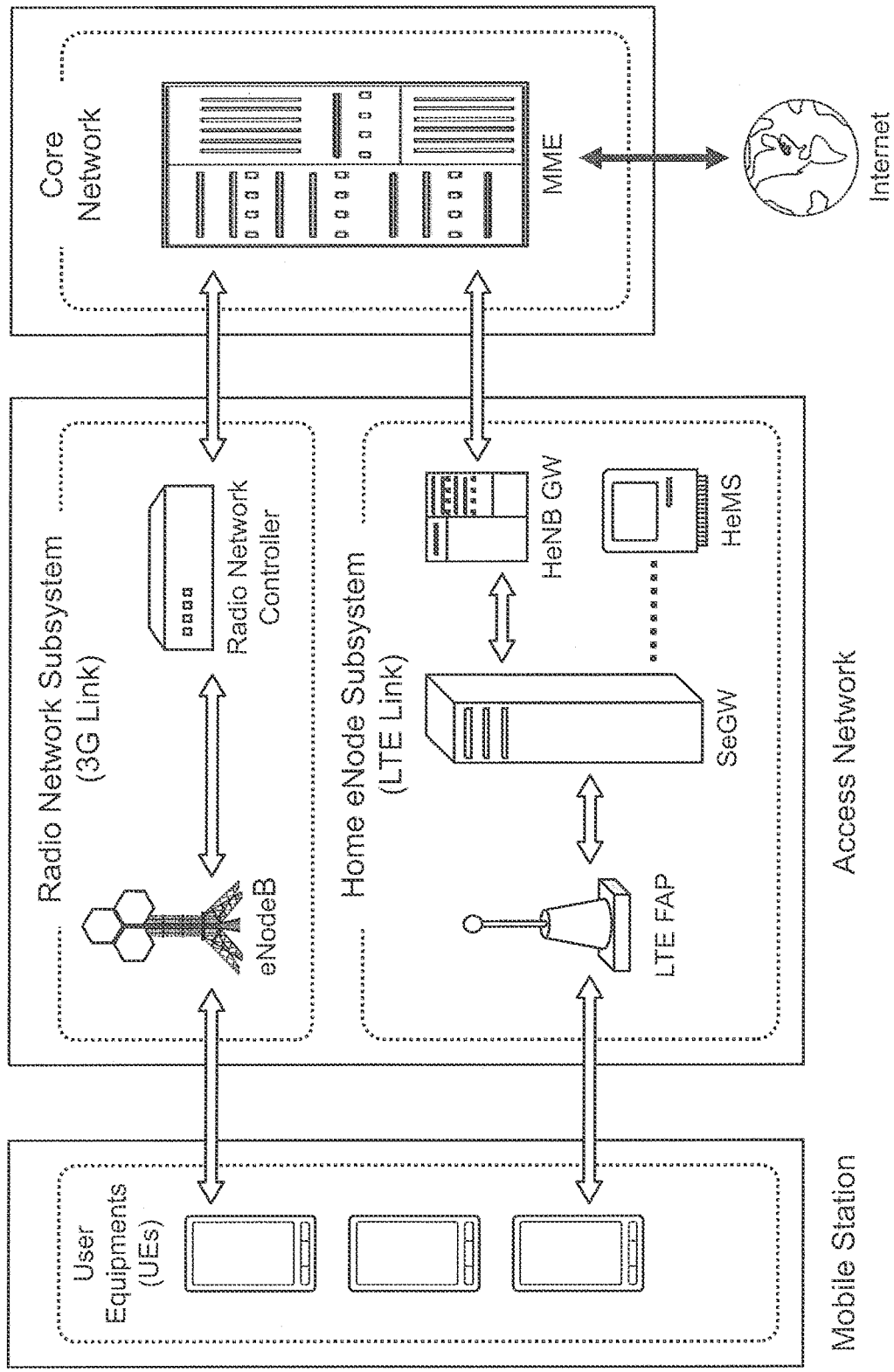
FIG. 3 is a diagram illustrating an example of a construction of a femtocell access point (FAP) for a small cell.

FIG. 3 is a diagram illustrating an example of a construction of a femtocell access point (FAP) for a small cell, and illustrates a construction of an evolved universal terrestrial radio access network (E-UTRAN) and the FAP of Third Generation Partnership Project (3GPP).

A mobile station in which user equipments (UEs) are included is connected to a core network through an access network. The access network includes a 3G link which is a radio network subsystem (RNS) including an eNodeB and a radio network controller (RNC) which is a network controller of the eNodeB, and a Long Term Evolution (LTE) link which is a home eNode subsystem (HeNS).

In FIG. 3, the HeNS includes an LTE FAP to which the UEs are connected wirelessly, a security gateway (SeGW), and an HeNS gateway (GW) for connecting a plurality of LTE FAPs to a core network. The SeGW operates and manages the LTE FAP by an HeNB management system (HeMS). The core network includes a mobile mobility entity (MME), and is provided with a packet service such as Internet, etc.

Figure 4:
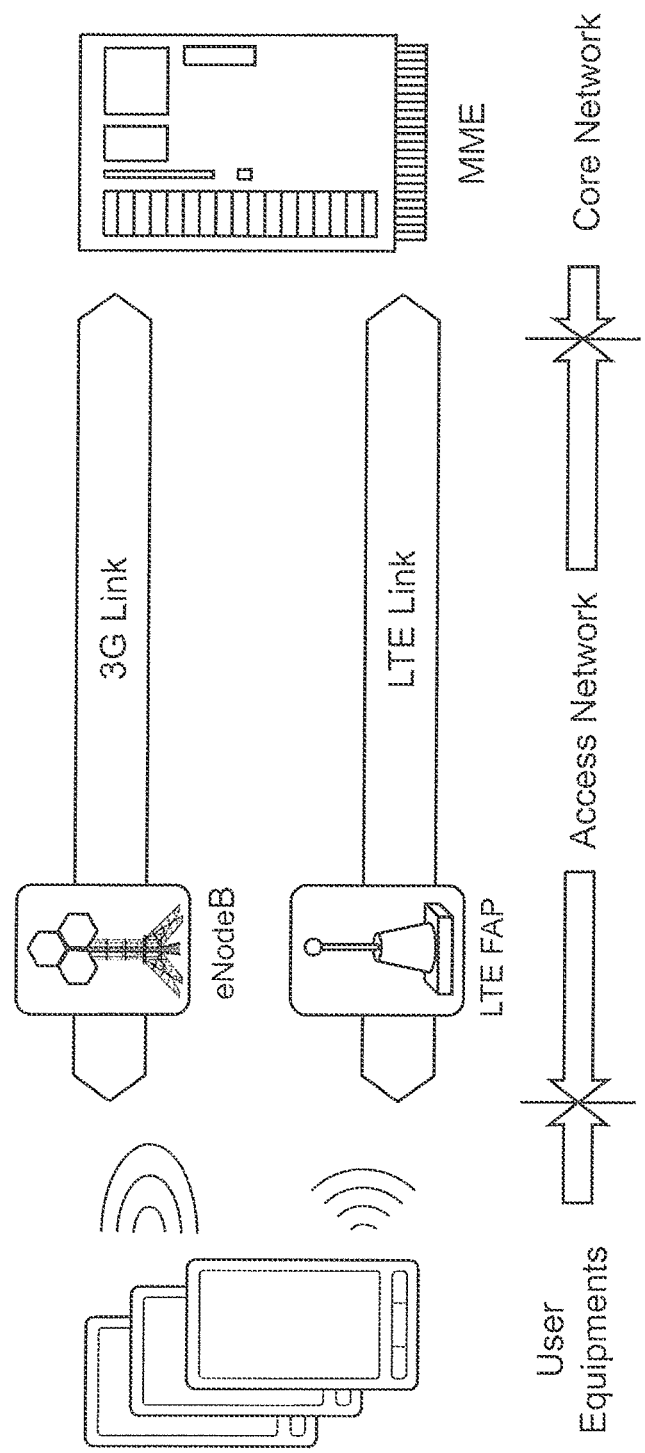
FIG. 4 is a diagram illustrating an example of a construction of a small cell configured as an evolved universal terrestrial radio access network (E-UTRAN) and an FAP of Third Generation Partnership Project (3GPP)

FIG. 4 is a diagram illustrating an example of a construction of a small cell configured as an E-UTRAN of 3GPP and an FAP. UEs are provided with services for the UEs by being connected to an MME through a dual path of an RNS and an LTE link of an HeNS configured as an FAP.

FIG. 5 is a table showing service types provided in a small cell configured as an FAP according to the present invention. A small cell of 3GPP provides a service such as a voice over LTE (VoLTE), packet switch video telephony (PSVT), and a normal packet service (PS) with a mobile station connected to a small cell. The VoLTE service is provided as a real time protocol (RTP) voice call, and the PSVT service is provided as an RTP video call. Further, the normal PS is provided with the mobile station connected to the small cell as a protocol of a transmission control protocol-hypertext transfer protocol (TCP-HTTP) or a transmission control protocol-file transfer protocol (TCP-FTP). Accordingly, a data load provided with the mobile station connected to the small cell increases in the order of VoLTE, PSVT, and normal PS service. Accordingly, when a plurality of users provided with the VoLTE and PSVT service are connected to a base station, connection of the mobile station is not permitted even when data service capacity of a system is sufficiently empty.

Figure 6:
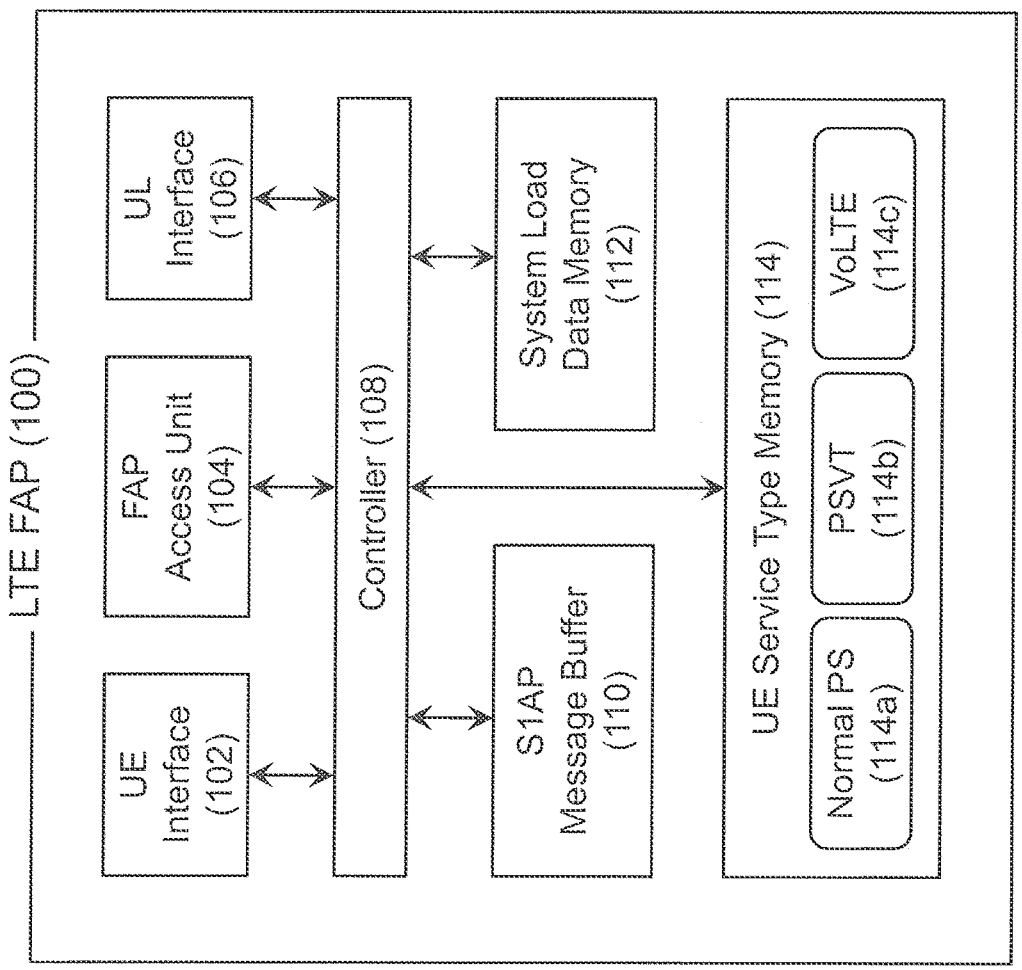
FIG. 6 is a diagram illustrating a construction of a flexible connection control FAP device of a small cell according to an embodiment of the present invention.

FIG. 6 is a diagram illustrating a construction of a flexible connection control FAP device of a small cell according to an embodiment of the present invention. An FAP device according to an embodiment of the present invention calculates a system load occurring when a mobile station is newly connected or transfers service according to the type of services such as the VoLTE, PSVT, or normal PS service that mobile stations, that is, UEs, desire to use, compares the calculated system load and a maximum system load, and determines and controls whether to limit connection of the mobile station. An LTE FAP 100, as the FAP device according to an embodiment of the present invention, includes a controller 108, a UE interface unit 102 connected to the controller 108, an up link interface unit 106 for connecting the LTE FAP 100 to an MME through an LTE link, and an FAP access unit 104 for an FAP service. The controller 108 includes an S1 interface application protocol (S1AP) message buffer 110 for storing an S1AP message of an E-UTRAN radio access bearer (E-RAB) for setup, change, or release of a service, a system load data memory 112 for storing system load related information of the LTE FAP 100, and a mobile station service type memory 114 including a normal PS memory 114a, a PSVT memory 114b, and a VoLTE memory 114c for storing information of the mobile stations to which the LTE FAP 100 provides service according to the type of services, such as the normal PS, PSVT, and VoLTE services.

The information of the mobile stations including the number of mobile stations which are currently in service is stored as the information of the mobile stations according to the type of services such as the normal PS, PSVT, and VoLTE services in the mobile station service type memory 114 with reference to information of the S1AP message buffer 110 by the controller 108.

Figure 7:
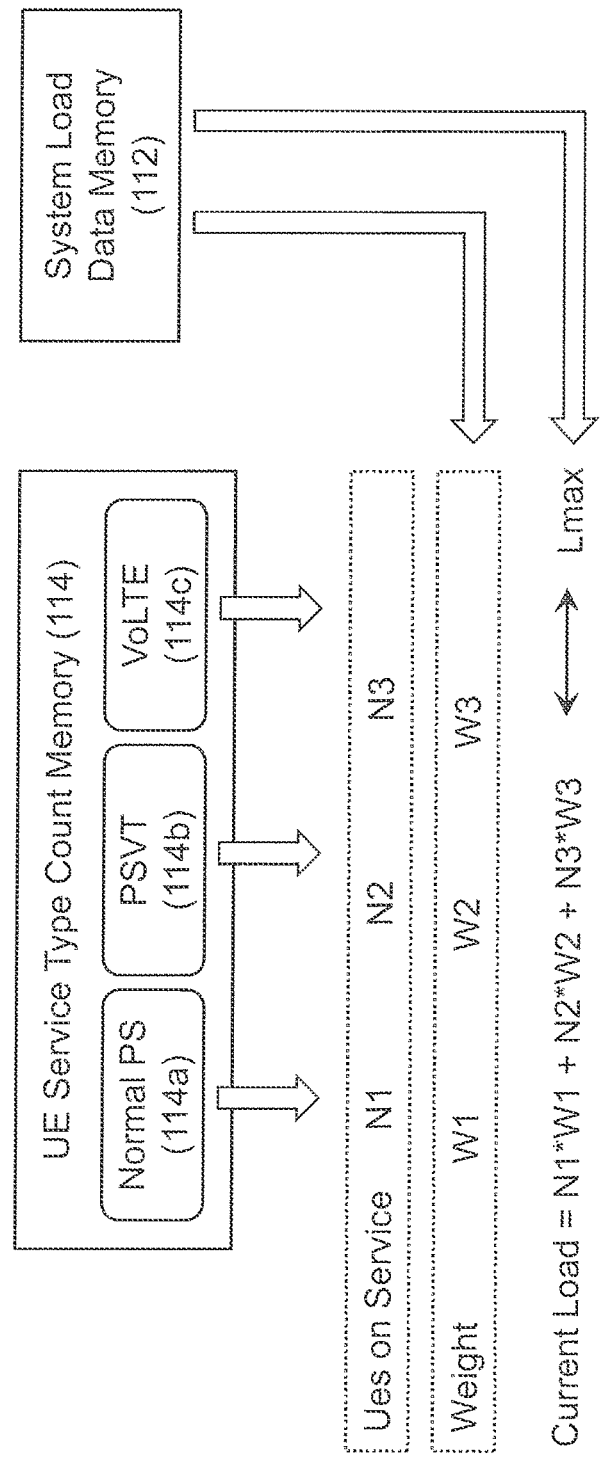
FIG. 7 is a diagram illustrating a mechanism of calculating a system load occurring when a mobile station is newly connected to an LTE FAP or transfers service according to one embodiment of the present invention.

FIG. 7 is a diagram illustrating a mechanism of calculating a system load occurring when a mobile station is newly connected to an LTE FAP or a service is switched according to one embodiment of the present invention. Information N1, N2, and N3 related to the number of mobile stations, that is, UEs, which are currently in service is updated and stored as the information of mobile stations according to the type of services, such as the VoLTE, PSVT, and normal PS services, in the mobile station service type memory 114 according to an embodiment of the present invention shown in FIG. 6 by the controller 108 when a mobile station is newly connected or transfers service. Further, weights W1, W2, and W3 determined according to the system load by each mobile station according to the type of services, such as the VoLTE, PSVT, and normal PS services, and a system load limit Lmax are stored in the system load data memory 112 according to an embodiment of the present invention.

When a mobile station is newly connected or transfers service, the controller 108 calculates a system load by multiplying each piece of information N1, N2, and N3 related to the number of mobile stations which are currently in service, that is, UEs which are in service, and each of the weights W1, W2 and W3, compares the calculated system load and the system load limit Lmax, and determines a remaining load.

As an example of calculating the system load, when the LTP FAP 100, as the FAP device of the present invention, has a system load capable of providing a service for 100 mobile stations when only the VoLTE service is provided, for 50 mobile stations when only the PSVT service is provided, or for 10 mobile stations when only the normal PS is provided, supposing that the weight W3 per mobile station of the normal PS with the greatest load is converted into 1.0, the weight W1 per a mobile station of the VoLTE service is 0.1 and the weight W2 per a mobile station of the PSVT service is 0.5. For each case, the system load limit Lmax is converted into 10 by multiplying the number of mobile stations and the weight according to the type of services, such as the VoLTE, PSVT, and normal PS services.

When the number N1, N2, and N3 of mobile stations with respect to each of the VoLTE, PSVT, and normal PS services is 10, 5, and 2, the system load is converted into N1×W1+N2×W2+N3×W3=1+2.5+2=5.5, and a remaining load is calculated as 4.5 with respect to the system load limit Lmax=10. Accordingly, the LTE FAP 100 which is currently in service may provide a service for 45 mobile stations when additionally providing only the VoLTE service, for 9 mobile stations when additionally providing only the PSVT service, for 4 mobile stations (fewer than 4.5 mobile stations) when additionally providing only the normal PS, or provide the VoLTE, PSVT, and normal PS service within the remaining load smaller than 4.5.

Figure 8:
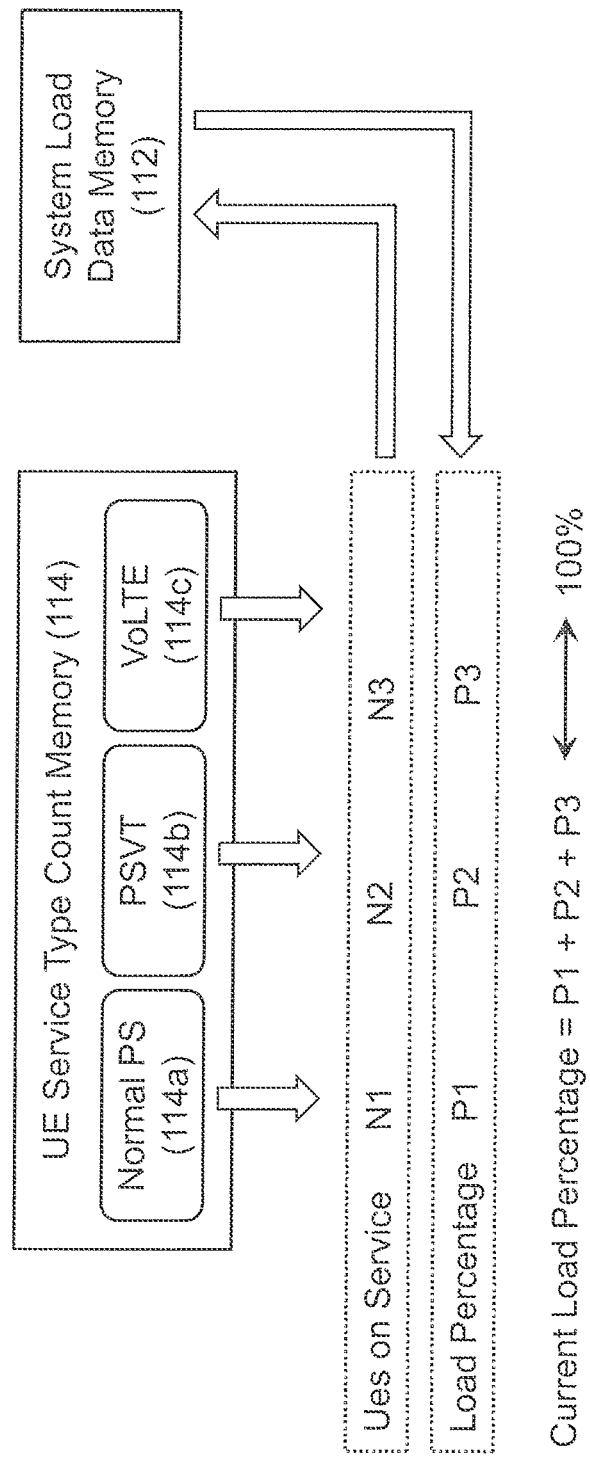
FIG. 8 is a diagram illustrating a mechanism of calculating a system load occurring when a mobile station is newly connected to an LTE FAP or transfers service according to another embodiment of the present invention.

FIG. 8 is a diagram illustrating a mechanism of calculating a system load occurring when a mobile station is newly connected to an LTE FAP or a service is switched according to another embodiment of the present invention. In an example shown in FIG. 8, change of a system load occurring when a mobile station is newly connected or transfers service is applied to the LTE FAP 100 representing the number of mobile stations and non-linear characteristics according to the type of services, such as the VoLTE, PSVT, and normal PS services. The LTE FAP 100 representing the non-linear characteristics may be applied to an LTE FAP in which a load of an additional processor is included by allocating an additional messaging or reporting function when the mobile station is newly connected and transfers the service.

As described in FIG. 6, the number N1, N2, and N3 of mobile stations which are currently in service is updated and stored as information of the mobile stations according to the type of services, such as the VoLTE, PSVT, and normal PS services, in the mobile station service type memory 114 according to an embodiment of the present invention by the controller 108 when the mobile station is newly connected and transfers the service. At this time, percentages P1, P2 and P3 of the system load determined by the number of mobile stations according to the type of services, such as the VoLTE, PSVT, normal PS services, are stored as system load related information in the system load data memory 112 according to an embodiment of the present invention. The percentages P1, P2, and P3 are values which are previously calculated or measured according to the VoLTE, PSVT, and normal PS services and the number of mobile stations, are stored in the system load data memory 112 by constructing a lookup table (LUT), and are referred by the controller 108.

When the mobile station is newly connected and transfers the service, the controller 108 finds a system load by adding the number N1, N2, and N3 of mobile stations according to the type of services, such as the VoLTE, PSVT, and normal PS services which are currently in service and the percentages P1, P2, and P3 stored in the system load data memory 112, respectively, compares the system load and the system load limit by setting a system load limit as 100%, and determines a remaining load.

Figure 9:
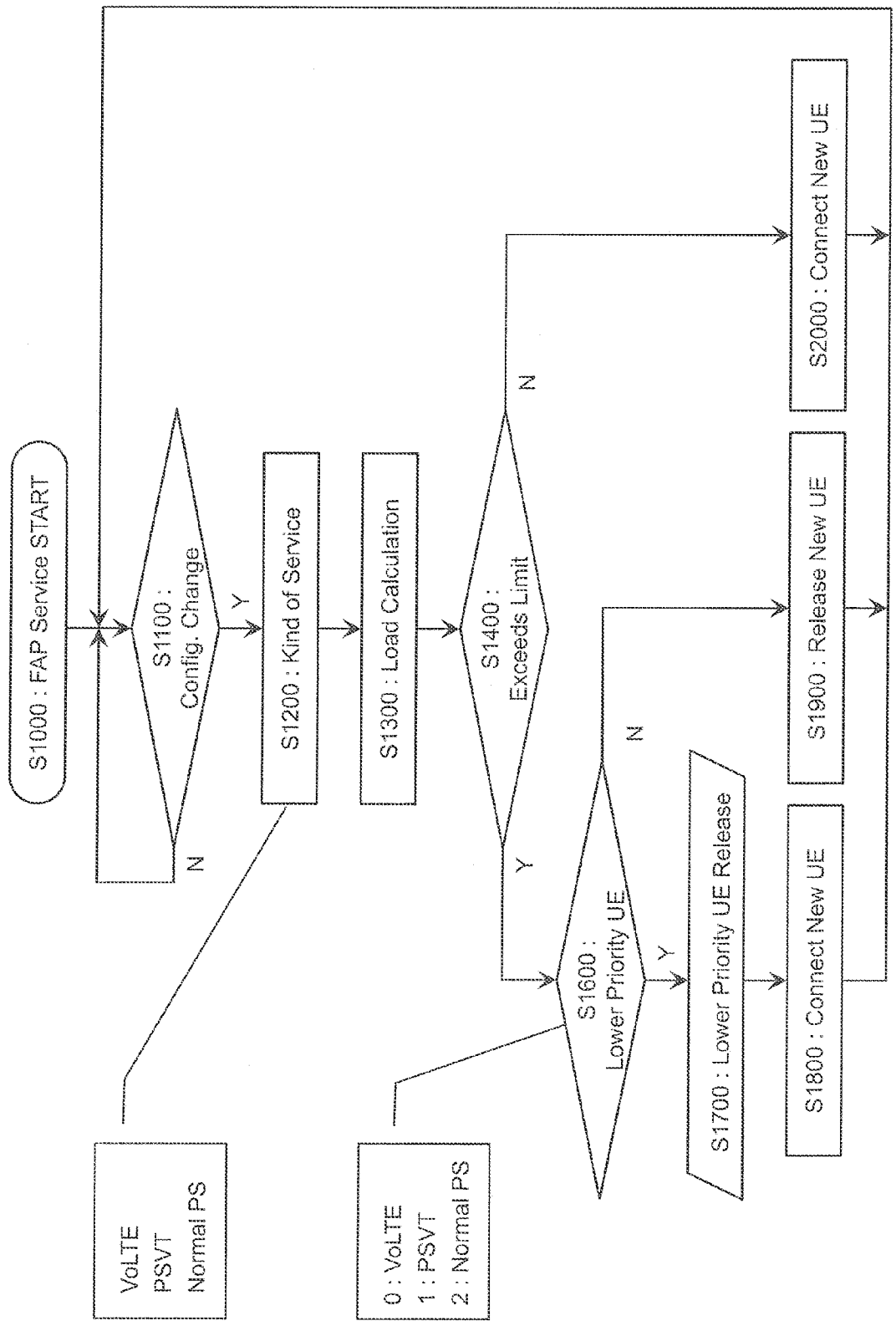
FIG. 9 is a flowchart for explaining a method of driving an LTE FAP using a flexible connection control FAP device of a small cell according to an embodiment of the present invention.

FIG. 9 is a flowchart for explaining a method of driving an LTE FAP as a flexible connection control FAP device of a small cell according to an embodiment of the present invention. Hereinafter, a method of driving an LTE FAP will be described in steps.

A service of the LTE FAP 100 is started (S1000).

The controller 108 of the LTE FAP 100 monitors whether there is change of a mobile station according to connection of a new mobile station or a hand in request from another LTE FAP (S1100). If not, the controller 108 continuously proceeds to step S1100 of monitoring whether there is the change of the mobile station.

When there is the change of the mobile station in step S1100, the controller 108 extracts and classifies the type of service, such as the VoLTE, PSVT service, or normal PS, for the new mobile station (S1200).

The controller 108 of the LTE FAP 100 calculates a system load when the controller 108 provides the extracted service type in the cell (S1300).

In step S1300, the controller 108 compares the calculated system load and a system load limit, and determines whether the calculated system load exceeds the system load limit (S1400).

In step S1400, if the calculated system load does not exceed the system load limit, the controller 108 connects the new mobile station to the LTE FAP 100, provides a service (S2000), and proceeds to step S1100 of monitoring whether there is the change of the mobile station.

In step S1400, if the calculated system load exceeds the system load limit, the controller 108 searches for other mobile station being provided with a service type having a lower order of priority than the service type of the new mobile station among the mobile stations which are currently connected to the LTE FAP 100 and provided with the VoLTE, PSVT, or normal PS service (S1600).

In step 1600, if there is no mobile station being provided with a service type having a lower order of priority than the service type the new mobile station, the controller 108 releases connection and service for the new mobile station (S1900), and proceeds to step S1100 of monitoring whether there is the change of the mobile station.

In step S1600, when if there is other mobile station being provided with a service type having a lower order of priority than the service type of the new mobile station, the controller 108 releases the connection and service with respect to the other mobile station being provided with the service type having the lower order of priority than the service type the new mobile station (S1700).

The controller 108 connects the new mobile station to the LTE FAP 100 (S1800), and proceeds to step S1100 of monitoring whether there is the change of the mobile station.

Step 1700 of releasing the connection and service with respect to the other mobile station being provided with the service type having the lower order of priority than the service type the new mobile station is performed after the connection and service with respect to the other mobile station are completed, and the controller 108 connects the new mobile station to the LTE FAP 100 and provides a service (S1800).

In step S1600 of searching for the other mobile station being provided with the service type having the lower order of priority than the service type of the new mobile station among the mobile stations which are currently connected to the LTE FAP 100 and provided with the VoLTE, PSVT, or normal PS services, the controller 108 sets the order of priority in decreasing order of the VoLTE, PSVT, normal PS service, and determines the order of priority.

FIG. 10 is a table showing a request message according to connection of a new mobile station and a hand in request with respect to an LTE FAP and information for extracting a service type with respect to the new mobile station according to an embodiment of the present invention. The request message is an S1AP message of an E-RAB occurring whenever there is connection of a new mobile station or a hand in request from another LTE FAP 100, and the S1AP message is transferred from an MME to the LTE FAP 100. The S1AP message is stored in the S1AP message buffer 110 by the controller 108 of the LTE FAP 100, and the controller 108 determines the service type according to the connection of the new mobile station or a hand in request from the stored S1AP message as a QCI included in the message.

FIG. 11 is a table showing content of a quality of service (QoS) class identifier (QCI) regulated in 3GPP TS 23.203 V12.2.0 (2013-09) according to an embodiment of the present invention. The QCI is defined from QCI1 to QCI9, and each value of the QCIs indicates an order of priority and service. The present invention extracts the type of service with respect to a new mobile station from a message for connection of the new mobile station and a hand in request using the QCI values.

FIG. 12 is a table showing an example of QCI values for extracting a service type with respect to a new mobile station from a request message for connection of the new mobile station or a hand in request according to an embodiment of the present invention.

Since the request message according to the connection of the new mobile station and the hand in request with respect to the LTE FAP 100 is an S1AP message of an E-RAB whenever there is the connection of the new mobile station or a hand in request from another LTE FAP and the S1AP message is transferred from an MME, the controller 108 finds a VoLTE service of an RTP voice call when the QCI of the E-RAB is QCI1, a PSVT service of an RTP video call when the QCI of the E-RAB is QCI1 for a voice and QCI2 for a video, and a normal PS service when the QCI of the E-RAB is QCI6.

FIG. 13 is a table showing a service type transfer process relationship of a mobile station connected to an LTE FAP and being provided with a service according to an embodiment of the present invention. The controller 108 of the LTE FAP 100 of the present invention for a service type transfer process continuously monitors E-RAB setup and E-RAB release messages while the connected mobile station is being provided with the service.

When the currently connected mobile station is provided with the normal PS service, the service of the currently connected mobile station is transferred to a VoLTE service when QCI1 is received as the E-RAB set message, and to a PSVT service when QCI1 and QCI2 are received as the E-RAB set message. When the currently connected mobile station is provided with the PSVT service, the service of the currently connected mobile station is transferred to the VoLTE service when QCI2 is received as the E-RAB release message, and to the normal PS service when QCI1 and QCI2 are received as the E-RAB release message. When the currently connected mobile station is provided with the VoLTE service, the service of the currently connected mobile station is transferred to the PSVT service when QCI2 is received as the E-RAB setup message, and to the normal PS service when QCI1 is received as the E-RAB release message.

FIG. 14 is a table showing a service type transfer rule of a mobile station currently connected to an LTE FAP and provided with a service according to an embodiment of the present invention. A service type transfer rule of the present invention always permits a service transfer when a system load decreases, and again connects to the LTE FAP 100 at the time point at which the normal PS service is started after performing an RRC connection release operation at the time point at which a voice or video call ends when the VoLTE or PSVT service is transferred to the normal PS service. Meanwhile, when the VoLTE service is transferred to the PSVT service, the RRC connection release operation is not performed since communication has to continue. Accordingly, when transferring a service type, the service type transfer rule calculates an estimated system load, permits transfer of a service type after releasing one mobile station being provided with the normal PS service when the estimated system load is greater than a maximum system load, and does not permit transfer of the service type but releases the mobile station when there is no mobile station being provided with the normal PS service. Further, when a mobile carrier has an LTE service frequency band other than a frequency band which is currently in service in a small cell, the service type transfer rule performs a redirection operation of a release mobile station through a corresponding frequency. When the mobile carrier provides a service of radio access technology (RAT) such as 3G, etc., the service type transfer rule performs the redirection operation of the release mobile station through a frequency which is in service of a corresponding RAT. The redirection operation may be implemented by adding a RedirectedCarrierInfo field to an RRC connection release message transferred to the mobile station when releasing the mobile station.

As described above, according to the flexible connection control FAP device of the small cell and the method of driving the same of the present invention, the present invention classifies UEs, that is, mobile stations, according to the type of services, such as the VoLTE, and PSVT services, and normal PS, that mobile stations desire to use in the small cell such as the femtocell, etc. to control the connection of mobile stations, controls whether to permit the connection and service of each mobile station based on the system load limit that occurs whenever each mobile station in the small cell is newly connected or transfers the type of service, and when the LTE FAP device has a maximum system load, preserves service continuity by considering an order of priority according to the type of services and performing connection admission and release operations.

According to the flexible connection control FAP device of the small cell and the method of driving the same of the present invention, the present invention performs flexible control to permit connection of a new mobile station according to the type of services, such as VoLTE, PSVT, and normal PS services, which mobile stations desire to use.

Further, the present invention classifies the type of service using a QCI value allocated with respect to each of EPS bearers, performs control to permit connection or service of a new mobile station based on a system load limit occurring due to mobile stations in the small cell, and increases service efficiency of an FAP device.

Moreover, the present invention preserves service continuity by considering an order of priority according to the type of services and performing connection admission and release operations when the FAP device has a maximum system load.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A flexible connection control FAP (Femtocell Access Point) device of a small cell comprising an LTE (Long Term Evolution) link and providing VoLTE (Voice over LTE), PSVT (Packer Switch Video Telephony), and normal PS (Packet Service) services to mobile stations connected to the small cell, the flexible connection control FAP device, comprising:
   a controller;
   a UE (User Equipment) interface connected to the controller;
   a UL (Up Link) interface configured to connect an LTE FAP to an MME (Mobile Mobility Entity) through the LTE link; and
   an FAP access unit for an FAP service,
   wherein the controller comprises:
   an S1AP (S1 interface Application Protocol) message buffer configured to store an S1AP message of an E-RAB (E-UTRAN (Evolved Universal Terrestrial Radio Access Network) Radio Access Bearer) for setup, change, or release of a service;
   a system load data memory configured to store system load related information of the LTE FAP; and
   a mobile station service type memory including a VoLTE memory, a PSVT memory, and a normal PS memory configured to store information on mobile stations to which the LTE FAP is providing a service according to the type of the VoLTE, PSVT, and normal PS services,
   wherein the controller determines and controls connection of a mobile station by comparing a calculated system load and a maximum system load after calculating a system load when the mobile station is newly connected or transfers the type of service according to the type of the services that the mobile stations desire to use.

2. The flexible connection control FAP device of a small cell of claim 1, wherein the mobile station service type memory comprises the VoLTE memory, PSVT memory, and normal PS memory configured to store the mobile station information including the number of mobile stations which are currently in service according to the type of the VoLTE, PSVT, and normal PS services with reference to information of the S1AP message buffer by the controller.

3. The flexible connection control FAP device of a small cell of claim 1, wherein the mobile station service type memory is configured to update and store the number of mobile stations which are currently in service as the mobile station information according to the type of the VoLTE, PSVT, and normal PS services by the controller when the mobile station is newly connected or transfers the type of service, and
   the system load data memory is configured to store weights determined using the system load according to the type of the VoLTE, PSVT, and normal PS services and a system load limit as the system load related information of the LTE FAP.

4. The flexible connection control FAP device of a small cell of claim 3, wherein the controller calculates the system load by multiplying the number of mobile stations which are currently in service and each of the weights according to the type of the VoLTE, PSVT, and normal PS services when the mobile stations are newly connected or transfer the type of service, and determines a remaining load by comparing the system load limit and the calculated system load.

5. The flexible connection control FAP device of a small cell of claim 1, wherein the mobile station service type memory is configured to update and store the number of mobile stations which are currently in service according to the type of the VoLTE, PSVT, and normal PS services as the mobile station information by the controller when the mobile station is newly connected or transfers the type of service, and the system load data memory is configured to store percentages of the system load determined by the number of mobile stations according to the type of the VoLTE, PSVT, and normal PS services as the system load related information of the LTE FAP.

6. The flexible connection control FAP device of a small cell of claim 3, wherein the percentages of the system are stored in the system load data memory by constructing an LUT (LookUp Table) of values which are previously calculated or measured according to the VoLTE, PSVT, normal PS services and the number of mobile stations.

7. The flexible connection control FAP device of a small cell of claim 5, wherein the controller finds the system load by adding the number of mobile stations which are currently in service according to the type of the VoLTE, PSVT, and normal PS services when the mobile station is newly connected or transfers the type of service and each of the percentages of the system load stored in the system load data memory, compares the added value and the system load limit by setting the system load limit to 100%, and determines the remaining system load.

8. A method of driving an FAP (Femtocell Access Point) device comprising an LTE (Long Term Evolution) link and providing VoLTE (Voice over LTE) PSVT (Packer Switch Video Telephony) and normal PS (Packet Service) services to mobile stations connected to a small cell, the method, comprising:
    starting a service of an LTE FAP;
    monitoring whether the mobile stations are changed according to connection of a new mobile station or a hand in request from another LTE FAP, or change of a service type by a controller of the LTE FAP, and if not, continuously monitoring;
    in the monitoring of whether the mobile stations are changed, if the mobile stations are changed, extracting and classifying the type of the VoLTE, PSVT, and normal PS services for the new mobile station;
    calculating the system load when the extracted service type is provided in the small cell by the controller of the LTE FAP;
    comparing the calculated system load and a system load limit, and determining whether the calculated system load exceeds the system load limit by the controller of the LTE FAP; and
    if the calculated system load is determined not to exceed the system load limit, connecting the new mobile station to the LTE FAP and providing a service, and proceeding to the monitoring of whether the mobile stations are changed by the controller,
    wherein the method includes determining and controlling connection of a mobile station by comparing a calculated system load and a maximum system load after calculating a system load when the mobile station is newly connected or transfers the type of service according to the type of services that the mobile stations desire to use.

9. The method of driving an FAP device of claim 8, wherein the determining of whether the calculated system load exceeds the system load limit comprises:
    when the calculated system load exceeds the system load limit, searching for other mobile station being provided with a service type having a lower order of priority than a service type of the new mobile station among mobile stations which are currently connected to the LTE FAP and provided with the VoLTE, PSVT, or normal PS service by the controller; and
    when there is no mobile station being provided with the service type having a lower order of priority than the service type of the new mobile station in the searching for the other mobile station, releasing the connection and service with respect to the new mobile station and proceeding to the monitoring of whether the mobile stations are changed.

10. The method of driving an FAP device of claim 8, wherein the searching of the other mobile station comprises:
    when there is the other mobile station being provided with the service type having the lower order of priority than the service type of the new mobile station, releasing the connection and service with respect to the other mobile station being provided with the type of service having the lower order of priority than the service type of the new mobile station; and
    connecting the new mobile station to the LTE FAP and providing a service by the controller, and proceeding to the monitoring of whether the mobile stations are changed.

11. The method of driving an FAP device of claim 10, wherein the releasing of the connection and service with respect to the other mobile station being provided with the type of service having the lower order of priority than the service type of the new mobile station comprises:
    connecting the new mobile station to the LTE FAP and providing the service by the controller after the connection and service with respect to the other mobile station being provided with the type of service having the lower order of priority than the service type of the new mobile station ends.

12. The method of driving an FAP device of claim 9, wherein the searching for the other mobile station being provided with a service type having the lower order of priority than a service type of the new mobile station among the mobile stations connected to the LTE FAP and being provided with the service comprises setting the order of priority to a decreasing order of the VoLTE, PSVT, and normal PS service, and determining the order of priority.

\* \* \* \* \*